Figure 1:
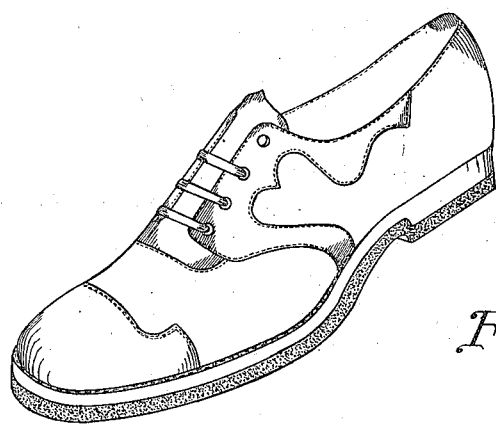

June 21, 1938.  H. F. ARMOR  2,121,678
FOOTWEAR AND SOLE MATERIAL THEREFOR
Filed Sept. 19, 1934

WATER VARNISH
SPONGE RUBBER
RUBBER CEMENT
FABRIC

INVENTOR.
Horace F. Armor
BY Frank C. Hilberg
ATTORNEY.

Patented June 21, 1938

2,121,678

UNITED STATES PATENT OFFICE 2,121,678

FOOTWEAR AND SOLE MATERIAL THEREFOR

Horace Francis Armor, Fairfield, Conn., assignor to E. I. du Pont de Nemours & Company, Wilmington, Del., a corporation of Delaware Application September 19, 1934, Serial No. 744,656

1 Claim. (Cl. 36—32)

This invention relates to the construction of footwear and more particularly to the construction of footwear such as slippers having rubberized fabric for the sole portion thereof.

In the construction of certain types of footwear such as shoes and slippers, it is common practice to provide a rubber composition sole in place of the usual leather sole. Such footwear is commonly designated as "rubber soled". The material used for such soles consists usually of a black or any other colored material made by molding a suitable rubber compound by means of heat and pressure to a definite pattern or a "crepe" rubber composition is made from "crepe" rubber sheet. The crepe sole is cut from a sheet of crepe rubber which has previously been prepared from coagulated rubber latex by working into the form of a sheet on so-called crepeing rolls. The use of this material while satisfactory from a quality standpoint, possesses some objections such as losses in cutting or molding, high cost and the necessity of combining the crepe sheet material with a suitable fabric so that the composite can be satisfactorily adhered to the upper portion of the footwear. In view of these objections, a more satisfactory material is in demand which is similar to the crepe rubber in construction and quality and which can be obtained in sheets of uniform size so as to be cut to maximum advantage and which is reasonable in cost.

This invention has an object the provision of an artificial crepe-type rubber composition material of novel, practical and useful qualities and characteristics for footwear soles. Further objects of the invention are to provide a rubber composition material suitable for footwear soles in continuous sheet lengths of uniform width to allow maximum cutting efficiency; to provide a material which simulates crepe rubber on one side and is smooth on the reverse side, and to provide a sole material which is relatively cheap in cost and has satisfactory quality.

These objects are accomplished by the following invention wherein a layer of cellular-structure rubber-composition or material adhered to a suitably prepared fabric by vulcanization forms the sole material of the footwear.

The invention in its preferred embodiment is carried out according to the following procedure:

To a suitable fabric such as a cotton duck weighing approximately 8 ounces per square yard is applied a thin coating of a rubber compound having the following approximate composition:

| | Pounds |
|---|---|
| Rubber | 40.0 |
| Softener | 1.0 |
| Zinc oxide | 4.0 |
| Fillers | 53.5 |
| Accelerators | 1.0 |
| Sulphur | 0.5 |
| | 100.0 |

This compound may be applied by any means well known in the art either as a semi-fluid composition prepared by dispersing the rubber compound in such dispersing media as gasoline, toluol, etc., and spread by means of a spreading machine or by sheeting into thin sheets and applying to the fabric by means of calender rolls. To this base coating on the fabric is applied a suitable film of a rubber composition of such formulation as is adapted on vulcanization to yield a film of cellular structure. Such a composition, given by way of an example but not by way of limitation, consists of:

| | Pounds | ozs. |
|---|---|---|
| Pale crepe rubber | 55 | |
| Zinc oxide | 4 | |
| Magnesium carbonate | 7 | |
| Fiber | 14 | |
| Petrolatum | 4 | |
| Ammonium bicarbonate | 4 | |
| *"Ureka C" master batch | 9 | |
| **"Tuads" master batch | | 12 |
| Sulfur master batch | 8 | |
| | 105 | 12 |

* An accelerator containing diphenylguanidinemercaptobenzothiazole.
** An accelerator containing tetramethylthiuramdisulfide.

Subsequent to the application of the cellular structure forming composition a film of so-called water varnish, of the type well known in the rubber spreading art, is applied. A water varnish suitable for this purpose may consist of:

| | |
|---|---|
| Shellac | 1 pound |
| Water | 2 gallons |
| Aqua ammonia (commercial) | ½ pint |

The fabric having the two films of rubber composition applied thereto is subjected to the action of heat which effects the formation of a cellular structure in the upper rubber composition layer and the subsequent vulcanization of both layers of rubber composition.

The temperature and time for the vulcanization will depend on the particular type of rubber compound used as the base coating as well as the type of rubber compound used to produce the cellular structure or sponge-like layer. After the vulcanization treatment the material is ready for use, that is, to be cut into suitable shapes for application to the uppers of footwear with the rubber and varnish surfacing constituting the wearing surface in order to serve as the sole material.

Figure 2:
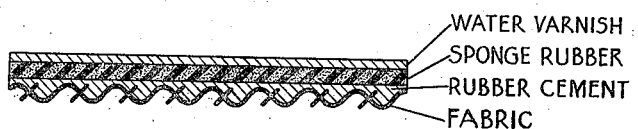

In the drawing, Figure 1 represents a shoe having a sole portion prepared according to the above process. Figure 2 shows diagrammatically an enlarged section of the coated fabric. The parts are clearly indicated in the drawing, which is enlarged for the sake of clarity and is not intended to be to scale.

In the description of the invention above the base material is noted as being a cotton duck fabric weighing approximately 8 ounces per square yard. Cotton ducks of other weights may be satisfactorily used as well as other cotton or other fiber fabrics such as are known as drills, sateens and broken twills. The choice of fabric will depend to a large extent on the weight and thickness of the finished material desired. Such choice will be readily apparent to those versed in the art of using such materials.

While a specific rubber composition is noted for use as the base coating on the fabric, it is not intended that the scope of the invention is limited thereby except as noted in the appended claim, as any rubber composition which yields a slightly tacky surface will give satisfactory results. Since a great variety of such compositions are known in the rubber compounding art, the choice of such a compound will be readily apparent to those skilled in this art. Similar circumstances exist with respect to the compositions which will produce under proper treatment masses of cellular structure. Such compositions are to many known as sponge rubber compositions. A large variety of such compounds exist in which various accelerators, blowing agents, softeners, pigments and fillers may be used and the compounding of which is well known in the art. In view of these circumstances it is practical only to give so-called type compounds whose interpretation can be readily made by those practicing the invention.

In addition to the aqueous alkaline shellac solution noted as the water varnish, other materials which will reduce the tack on the surface of the rubber composition which produces on later treatment the cellular-structure film such as aqueous alkaline casein dispersions, lacquers, oil varnishes, soap solutions and dusting agents such as talc, mica, starch, etc., may be used.

The amount of base film on the fabric may be varied according to the thickness of the cellular structure producing composition used but sufficient should be applied to secure permanent anchorage or bond between the fabric and the base film on one hand and the cellular structure producing compound and the base film on the other hand. The thickness of the cellular structure film or layer will depend on the particular type of footwear to be soled. The thickness may vary, that is, between $\frac{1}{16}''$ and $\frac{1}{4}''$ although no limitation within a practical range is placed on the thickness of the layer which can be satisfactorily used. A light weight footwear will not require, naturally, as heavy a layer as heavier footwear. The selection of the proper thickness to be used as a sole material will be readily apparent to those skilled in the art of constructing footwear.

The invention is adapted for use on footwear in general where leather, crepe rubber, dense rubber sheet or other materials are now used and more in particular to lighter weight footwear of the slipper type, and is particularly useful because it is strong and durable, is economical because of low loss in cutting; reduces cutting time per unit area, and eliminates the operation of combining in the case of use of crepe rubber to a suitable fabric so as to obtain a smooth surface on one side of the sole material to be properly adhered to the upper portion of the footwear. Another economic advantage is the low ultimate cost of the sole material in comparison to other materials commonly used for the same purpose.

It is apparent that many widely different embodiments of this invention may be made without departing from the spirit and scope thereof and, therefore, it is not intended to be limited except as indicated in the appended claim.

I claim:

A footwear sole having a wearing surface simulating crepe rubber on one side and presenting on the other side a smooth surface to be attached to a shoe upper to form a complete article of footwear, said sole consisting of a fabric having on one side a layer of vulcanized dense rubber, a layer of sponge rubber constituting the wearing portion of the sole on said coating of dense rubber and formed in situ during vulcanization thereof to simulate a crepe rubber layer, and a tack-reducing layer on said sponge rubber layer.

HORACE FRANCIS ARMOR.